Feb. 7, 1950
C. L. FOX
2,496,787
POWER TAKE-OFF FOR VEHICLES
Filed Jan. 30, 1947
2 Sheets—Sheet 1
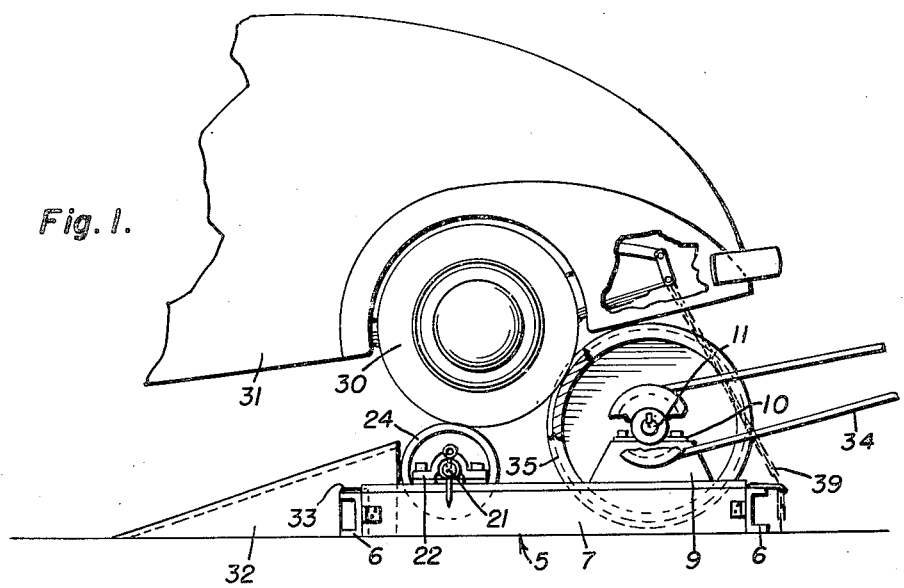
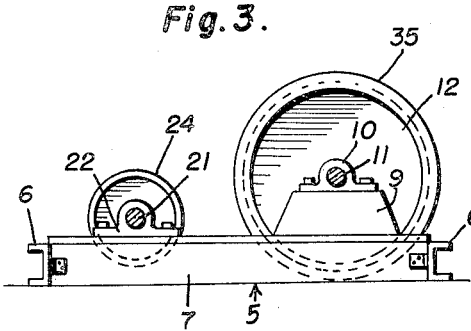
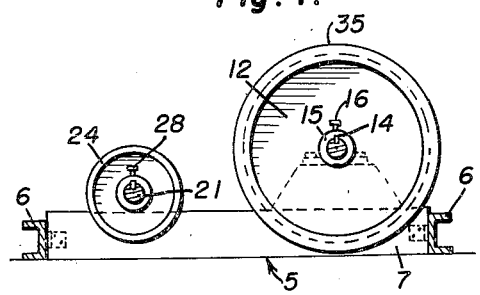
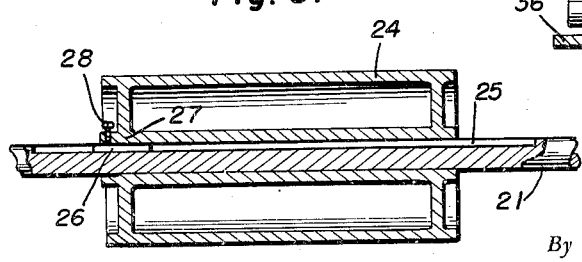
Inventor
Charles L. Fox
By *Clarence A. O'Brien
and Harvey B. Jacobson*
Attorneys

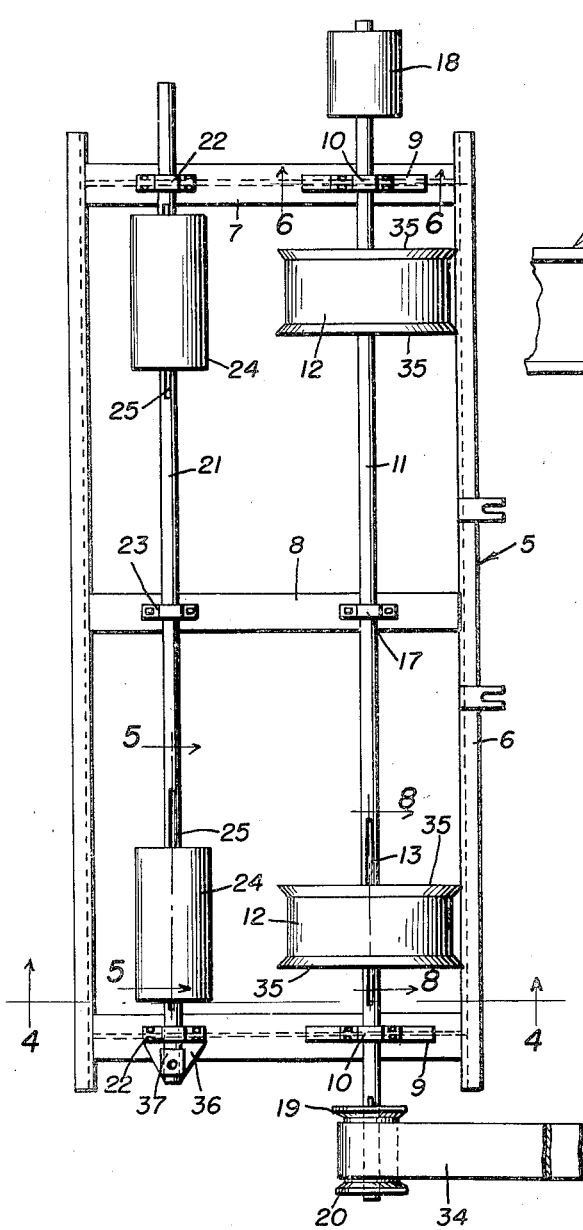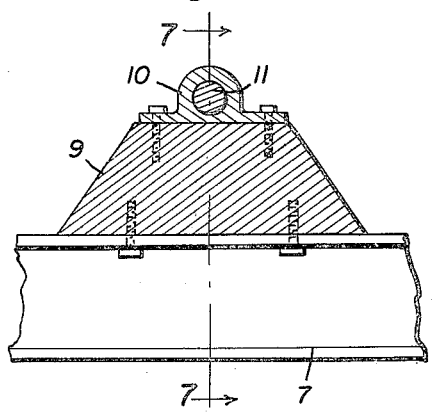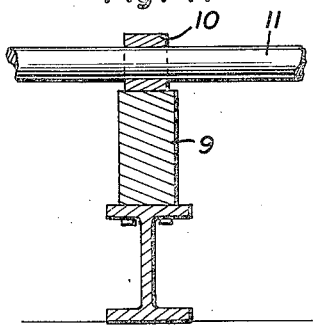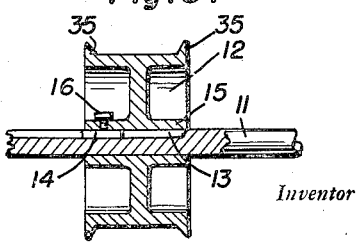

Patented Feb. 7, 1950

2,496,787

UNITED STATES PATENT OFFICE 2,496,787

POWER TAKE-OFF FOR VEHICLES

Charles L. Fox, Independence, Mo., assignor of one-half to Joseph W. Barnard, Independence, Mo.

Application January 30, 1947, Serial No. 725,372

1 Claim. (Cl. 287—1)

The present invention relates to new and useful improvements in power take-off devices and more particularly to a power device adapted to be driven by the drive wheels of an automobile or other motor driven vehicle for use in the operation of various types of machinery where other sources of power are not available.

An important object of the present invention is to provide a portable power take-off device of this character including a frame supporting a pair of friction drive wheels and providing means for running the drive wheels of the vehicle into position with the friction drive wheels of the power take-off whereby the latter may be utilized for operating various types of machinery by means of a belt drive connected to the shaft of the friction drive wheels.

A further object of the invention is to provide a power take-off shaft on which the friction drive wheels are slidably keyed to adjust same in accordance with variations in the width in the vehicle employed for operating the power take-off.

A still further object is to provide an apparatus of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view showing the drive wheels of an automobile mounted in position on the power take-off.

Figure 2 is a top plan view.

Figure 3 is a side elevational view with the vehicle removed therefrom.

Figure 4 is a sectional view taken on a line 4—4 of Figure 2.

Figure 5 is a longitudinal sectional view of one of the idler rollers taken on a line 5—5 of Figure 2.

Figure 6 is an enlarged sectional view of one of the bearing supports taken on a line 6—6 of Figure 2.

Figure 7 is a sectional view taken on a line 7—7 of Figure 6.

Figure 8 is a transverse sectional view of one of the friction drive wheels showing the slidable adjustment therefor and taken on a line 8—8 of Figure 2, and Figure 9 is an enlarged fragmentary sectional view of the locking pin for the shaft of the idler rollers.

Referring now to the drawings in detail, wherein for the purpose of illustration I have disclosed a preferred embodiment of the invention the numeral 5 designates the horizontal frame for the power take-off and which is composed of a pair of longitudinal channel frame members 6 connected at their ends by a frame member 7 of I-beam construction. A transverse frame member 8 also connects the longitudinal frame member 6 intermediate their ends and is likewise of I-beam construction.

The frame 5 is of rectangular shape and to the end of each of frame members 7 is bolted or otherwise suitably secured a bearing supporting block 9 to the upper edge of which a bearing bracket 10 is secured for journalling a drive shaft 11 therein adjacent the rear edge of the frame.

A pair of friction drive wheels 12 are slidably keyed on the shaft 11 inwardly of the bearing bracket 10 by means of a longitudinally extending key-way 13 formed in the shaft 11 and in which a key 14 is slidably received, the key being secured to the hub 15 of the wheel by a set-screw 16. The drive wheels 12 are thus rotatably connected to the shaft 11 for adjustment longitudinally on the shaft.

The intermediate portion of the shaft 11 is journalled in a bearing bracket 17 secured to the intermediate frame member 8 and to the ends of the shaft are keyed or otherwise secured conventional pulleys 18 and 19, one of which may be flanged as shown at 20.

A second shaft 21 is also journalled in bearing brackets 22 secured to the end frame members 7 and to a bearing bracket 23 secured to the intermediate frame member 8, the shaft 21 being positioned adjacent the front edge of the frame 5.

A pair of idler rollers 24 are slidably keyed to the shaft 21 by means of a key-way 25 formed in the shaft and in which a key 26 is slidably received, the key being secured to the hub 27 of the idler rollers by a set-screw 28, to secure the rollers in longitudinally adjusted position on the shaft 21.

The idler rollers 24 are positioned adjacent each of the friction drive wheels 12 so as to support the drive wheel 30 of an automobile or other motor driven vehicle 31 in position in frictional driving engagement with the wheels 12. The vehicle is backed onto the rollers 24 by means of removable ramps or runways 32 each having a notch 33 in its lower edge for receiving the front longitudinal frame member 6 to anchor the ramp to the frame.

After the drive wheels 30 of the vehicle have been driven onto the rollers 24 in contact with the friction driven wheels 12 the driving of the wheels will operate the pulleys 18 and 19 and power therefrom is used to operate various types of machinery by a belt 34 trained over one or both of said pulleys.

The friction driven wheels 12 are flanged as shown at 35 to prevent riding of the drive wheels 30 therefrom and the wheels 12 and rollers 24 may be adjusted to the width of the vehicle.

One of the bearings 22 for the idler shaft 21 is formed with a horizontal plate or tongue 36 having a collar 37 in which the end of the shaft 21 is journalled, the shaft and collar having aligned openings for receiving a locking pin 38 to lock the rollers against movement when it is desired to run the vehicle off the rollers.

Chains 39 may be employed to anchor the vehicle against movement on the rollers and friction driven wheels.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

I claim:

In a power take-off device of the type embodying pairs of spaced rollers for supporting the rear wheels of an automobile, a rotary shaft having one of the pairs of rollers fastened thereon, bearings for the ends of the shaft, one of said bearings having a lateral plate thereon provided with a fixed collar in which one end of the shaft is rotatable, said collar and end of the shaft being apertured, and a pin for extension through said apertures to lock the shaft against turning at will.

CHARLES L. FOX.

REFERENCES CITED

The following references are of record in the file of this patent:

UNITED STATES PATENTS

| Number | Name | Date |
|---|---|---|
| 1,009,204 | Winden | Nov. 21, 1911 |
| 1,201,863 | Orey | Oct. 17, 1916 |
| 1,205,288 | Thomas | Nov. 21, 1916 |
| 1,366,614 | Walker et al. | Jan. 25, 1921 |
| 1,493,547 | Johnson et al. | May 13, 1924 |
| 1,733,762 | Fisdall | Oct. 29, 1929 |
| 2,369,513 | Zahodiakin | Feb. 13, 1945 |

FOREIGN PATENTS

| Number | Country | Date |
|---|---|---|
| 434,829 | Great Britain | Sept. 10, 1935 |